Patented Mar. 13, 1951

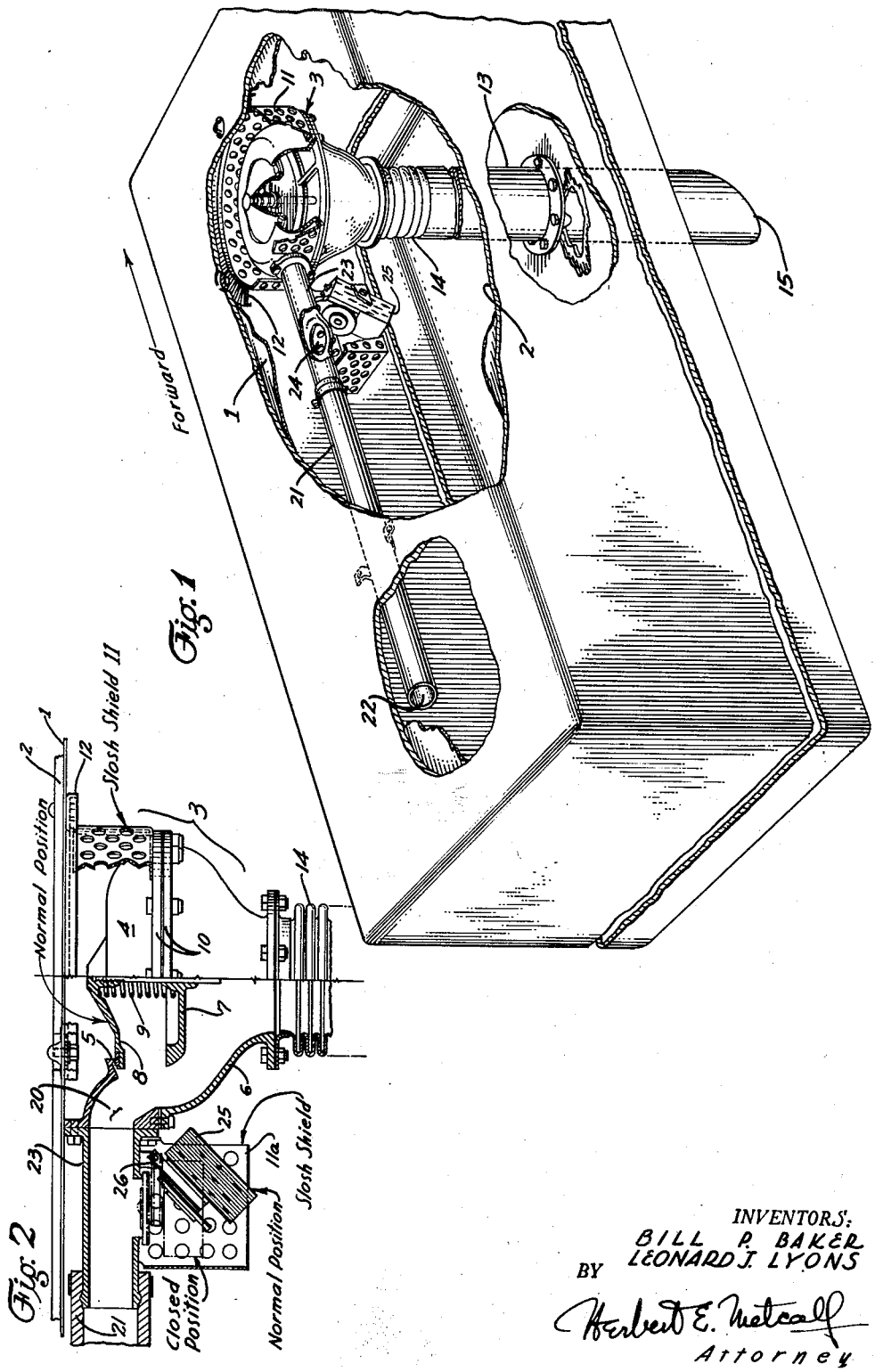

2,544,820

UNITED STATES PATENT OFFICE 2,544,820

FUEL TANK VENT VALVE

Bill P. Baker, Inglewood, and Leonard J. Lyons, Los Angeles, Calif., assignors to Northrop Aircraft, Inc., Hawthorne, Calif., a corporation of California Application May 19, 1949, Serial No. 94,146

4 Claims. (Cl. 220—85)

This invention relates to airplanes, and more particularly, to a vent valve for airplane fuel tanks.

In airplane fuel systems, a tank vent system is commonly provided to allow air from the atmosphere to have access to the fuel tanks to maintain substantially equal pressures outside and inside the tank. Some means such as this must be provided to prevent collapsing or bursting of the tanks and to assure the proper supply of fuel to the airplane engine. The vent system usually contains one or more lengths of tubing bent so as to form a trap and thus prevent fuel from being lost through the vent openings during maneuvers in which the fuel is covering part of the top of the tank.

Operating under conditions existing until only recently, these vent systems have performed satisfactorily in allowing sufficient rates of flow of air or fuel vapor to and from the tanks. However, the high rate of climb of some present-day airplanes, coupled with high fuel temperatures, poses a problem not solved by ordinary methods. As the airplane ascends rapidly into regions of lower pressure, the fuel, retaining substantially its original temperature for a considerable length of time, reaches its boiling point, and thus gives off vapor at a greatly increased rate. Vent lines of normal size are not adequate to maintain the internal tank pressure equal to atmospheric pressure on the outside of the tank when the fuel is violently boiling, and the tank will fail due to the high differential pressure developed.

In military airplanes, for example, the maximum allowable differential tank pressure is 2 p. s. i., and the vent lines, if enlarged to accommodate the required rate of vapor flow, including allowance for line pressure drop due to the bends of the aforementioned traps, would reach such a size and weight as to be prohibitive.

The nature of the problem is more fully realized by noting that during a climb from 13,000 feet to 30,000 feet, for example, when using fuel having a vapor pressure of 7 p. s. i., at 110° F., approximately 10% of the fuel is converted into vapor. When this climb is accomplished in a relatively short time, or when the tank capacity is relatively great, say around 800 gallons, the vent line diameter would have to be increased to three or more times its normal value, due to the boiling of the fuel, in order to effect the required rapid flow of fuel vapor.

It is an object of this invention to provide a fuel tank vent system capable of venting the large quantities of vapor caused by fuel boiling during a climb, which is superior to the conventional vent piping necessary for the same job.

In brief, the present invention comprises a valve assembly located in the tank above the normal fuel level, arranged to be exposed to internal tank pressure on one side and external air pressure on the opposite side, and automatically opening when the differential pressure exceeds a predetermined value. Additional vent means are preferably provided which are capable of handling venting for all normal flight conditions, the valve passage merely supplying the extra capacity required during the boiling stage. During attitudes of the airplane when the valve assembly is covered by fuel, the additional vent means also provide a sufficient vent outlet at a location above the fuel level, and the valve is designed to remain closed to prevent fuel loss at these attitudes.

In the drawings, shown by way of illustration and not limitation:

Figure 1 is a perspective view showing one preferred embodiment of the vent system of the present invention as installed in an airplane fuel tank.

Figure 2 is a side view, partly in longitudinal section, showing a vent valve and a float valve used in the present invention.

Referring first to Figure 1 for a detailed description of our invention, a fuel tank 1, forming one cell of an airplane fuel system, is installed in a tank cavity and secured to a tank liner 2 surrounding the tank 1 and forming part of the airplane fixed structure. Also supported by the liner 2 is a valve assembly 3 installed at the top inside of the tank 1 near the forward end thereof.

The valve assembly 3 (Figure 2) comprises a top casing 4 with an opening forming a valve seat 5 about 4¼ inches in diameter and a bottom casing 6 containing an internal valve base 7, vent valve 8, and valve spring 9. The two casings are bolted together at mating flanges 10 to which is also attached a slosh shield 11 surrounding the top casing 4 and projecting upwardly to terminate in a mounting flange 12 suitably secured through the tank 1 to the tank liner 2. The valve spring 9 is arranged to urge the vent valve 8 upwardly against the valve seat 5 to close the large opening between the inside of the tank 1 and the inside of the valve assembly 3.

Attached to the bottom casing 6 is a standpipe 13 open to the inside of the valve assembly 3. A flexible connection 14 is included in the standpipe 13 to allow for slight misalignments and expansion or contraction. At the bottom of the tank 1, a hole is provided through which the standpipe 13 effectively passes. The hole edges are sealed by gaskets as is well known in the art, and a pipe extension 15 continues downwardly to a point in contact with the outside air.

Thus it is seen that when the atmospheric pressure decreases to a predetermined value below the internal tank pressure, the vent valve 8 will be forced open to allow fuel vapor to escape through the valve and prevent the differential pressure from exceeding a maximum.

The top casing 4 also contains a vent port 20 below the valve seat 5. The vent port 20 connects to a vent line 21 proceeding rearwardly to terminate in an open end 22 located next to the top of the rear part of the tank 1. Next to the valve assembly 3, the vent line 21 contains a fitting 23 having a float valve opening 24 and a hinged float valve 25 adapted to raise to close off the float valve opening 24. The float valve 25 is pivotally supported on the fitting 23 by a hinge 26.

The vent line 21 functions in the following manner. When the airplane and tank are in a level or climbing position, the float valve 25 hangs open and thus provides a vent passage through the opening 24, fitting 23, vent port 20, bottom casing 6, and standpipe 13 to the atmosphere surrounding the tank 1. The size of this passage is sufficient to allow adequate venting for all normal conditions with the vent valve 8 closed. If the airplane goes into a dive, fuel will gravitate forward and cover the float valve 25 to close it and prevent liquid fuel from draining down the standpipe 13. In this position, the vent line open end 22 is above the fuel level, so that ordinary venting is permitted through the vent line 21. If the airplane is in a climb, the open end 22 will be covered by fuel, but the fuel of course will not run uphill to the top of the standpipe 13.

The vent valve 8 in this particular embodiment is designed to crack open at ½ p. s. i. and to reach its full open position at 1 p. s. i. differential pressure. During a fast climb, especially after leaving a relatively hot ground area, the fuel will start to boil at a certain critical altitude, and the fuel vapor thus generated will not escape through the normal vent line 21 fast enough to maintain atmospheric pressure in the tank 1. When this condition is reached, the vent valve 8 will open to provide several times the vent area otherwise available, and thus maintain the differential pressure below the maximum allowable value of 2 p. s. i.

Since the airplane is not nosing down in such a circumstance, the valve assembly 3 is above the fuel level, and fuel vapor only is released.

The slosh shield 11 and a similar perforated shield 11a around the float valve 25 are preferably provided to stop a large percentage of each wave of fuel which momentarily surrounds the two valve areas during sloshing of the fuel. Besides saving fuel which would otherwise wash over into the standpipe 13, the shields minimize damage to the valve parts caused by wave impulse.

Connections to the valve assembly 3 may be modified to accommodate any size, shape, or type construction of tank, or the standpipe 13 may be routed to any other desired position. The direction of vent valve operation also may be altered; that is, the valve assembly 3 may be inverted, without adversely affecting the system operation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

What is claimed is:

1. A fuel tank vent system comprising a vent valve elastically urged to a closed position, the inlet side of said valve being exposed to the vapor pressure above the normal level of the fuel in said tank, the outlet side of said valve being exposed to the ambient atmosphere, said valve being mounted within said tank near the forward end thereof, a vent pipe connected to said vent valve on said outlet side, said vent pipe having an open end in direct contact with said vapor above said normal fuel level near the rear end of said tank, and means defining an opening in the wall of said vent pipe as close as practicable to said vent valve, said opening also being in direct contact with said vapor above said normal fuel level.

2. Apparatus in accordance with claim 1 wherein said vent pipe is of sufficient size to provide adequate flow of air or fuel vapor between said tank and said atmosphere under normal conditions of temperature and pressure, and wherein said vent valve is adapted to open under the differential pressure caused by the boiling of said fuel to provide for a substantially greater rate of vapor flow, whereby said differential pressure is prevented from exceeding a predetermined safe value determined by operating conditions.

3. Apparatus in accordance with claim 1 wherein said vent valve is positioned with said inlet facing upwardly, and wherein ducting means is connected to said outlet to pass through said tank to said ambient atmosphere.

4. Apparatus in accordance with claim 1 wherein said opening is positioned in the lower side of said vent pipe, and a float valve is freely hinged in position to raise to close said opening when said fuel rises around said opening, whereby excessive loss of fuel through said vent pipe and said vent valve is prohibited.

BILL P. BAKER.
LEONARD J. LYONS.

REFERENCES CITED

The following references are of record in the file of this patent:

UNITED STATES PATENTS

| Number | Name | Date |
|---|---|---|
| 888,739 | Reiber | May 26, 1908 |
| 906,381 | Carmer et al. | Dec. 8, 1908 |
| 1,107,084 | Mason | Aug. 11, 1914 |
| 1,258,915 | Kramer | Mar. 12, 1918 |
| 1,923,384 | Miller | Aug. 22, 1933 |
| 2,234,393 | Amiot | Mar. 11, 1941 |
| 2,340,936 | Cook | Feb. 8, 1944 |
| 2,383,369 | Curtis | Aug. 21, 1945 |
| 2,404,765 | Valentyne | July 23, 1946 |

FOREIGN PATENTS

| Number | Country | Date |
|---|---|---|
| 572,839 | Great Britain | Oct. 25, 1945 |